United States Patent
Maurer et al.

(10) Patent No.: US 9,734,390 B2
(45) Date of Patent: Aug. 15, 2017

(54) METHOD AND DEVICE FOR CLASSIFYING A BEHAVIOR OF A PEDESTRIAN WHEN CROSSING A ROADWAY OF A VEHICLE AS WELL AS PASSENGER PROTECTION SYSTEM OF A VEHICLE

(71) Applicant: Robert Bosch GmbH, Stuttgart (DE)

(72) Inventors: Thomas Maurer, Neuendettelsau (DE); Thomas Gussner, Ludwigsburg (DE); Lutz Buerkle, Stuttgart (DE); Dariu M Gavrila, Ulm (DE)

(73) Assignee: Robert Bosch GmbH, Stuttgart (DE)

( * ) Notice: Subject to any disclaimer, the term of this patent is extended or adjusted under 35 U.S.C. 154(b) by 66 days.

(21) Appl. No.: 14/604,130

(22) Filed: Jan. 23, 2015

(65) Prior Publication Data

US 2015/0206001 A1  Jul. 23, 2015

(30) Foreign Application Priority Data

Jan. 23, 2014 (DE) ........................ 10 2014 201 159

(51) Int. Cl.
*G06K 9/00* (2006.01)
*G06K 9/62* (2006.01)

(52) U.S. Cl.
CPC ..... *G06K 9/00342* (2013.01); *G06K 9/00805* (2013.01); *G06K 9/6267* (2013.01); *G06T 2207/10016* (2013.01); *G06T 2207/30241* (2013.01); *G06T 2207/30261* (2013.01)

(58) Field of Classification Search
None
See application file for complete search history.

(56) References Cited

U.S. PATENT DOCUMENTS

| | | | | |
|---|---|---|---|---|
| 8,547,249 B2* | 10/2013 | David | ................... | G08G 1/166 340/435 |
| 9,302,678 B2* | 4/2016 | Murphy | ............... | B60W 50/14 |
| 9,373,042 B2* | 6/2016 | Ogawa | ................... | G08G 1/166 |
| 2010/0076621 A1* | 3/2010 | Kubotani | ............... | G08G 1/166 701/1 |
| 2012/0133497 A1* | 5/2012 | Sasaki | ............... | G06K 9/00805 340/425.5 |
| 2013/0197736 A1* | 8/2013 | Zhu | ....................... | G05D 1/0088 701/26 |
| 2014/0062685 A1* | 3/2014 | Tamatsu | ................. | B60Q 5/005 340/425.5 |
| 2014/0219505 A1* | 8/2014 | Kindo | ...................... | G08G 1/08 382/103 |
| 2015/0035685 A1* | 2/2015 | Strickland | ............. | B60Q 9/008 340/901 |

(Continued)

*Primary Examiner* — Soo Park
(74) *Attorney, Agent, or Firm* — Norton Rose Fulbright US LLP; Gerard Messina

(57) ABSTRACT

A method for classifying a behavior, of a pedestrian when crossing a roadway of a vehicle, includes reading in a sensor signal to detect the pedestrian and at least one piece of surroundings information regarding surroundings of the pedestrian. The sensor signal represents here a signal of at least one sensor of the vehicle. The method further includes ascertaining at least one physical variable of a correlation between the pedestrian and the at least one piece of surroundings information. Finally, the method includes classifying the behavior of the pedestrian using the at least one physical variable.

14 Claims, 3 Drawing Sheets

(56) References Cited

U.S. PATENT DOCUMENTS

2015/0094878 A1* 4/2015 Miura ................... B60W 30/09
 701/1
2016/0042237 A1* 2/2016 Shimizu ................ G06T 7/2086
 348/148

* cited by examiner

METHOD AND DEVICE FOR CLASSIFYING A BEHAVIOR OF A PEDESTRIAN WHEN CROSSING A ROADWAY OF A VEHICLE AS WELL AS PASSENGER PROTECTION SYSTEM OF A VEHICLE

RELATED APPLICATION INFORMATION

The present application claims priority to and the benefit of German patent application no. 10 2014 201 159.0, which was filed in Germany on Jan. 23, 2014, the disclosure of which is incorporated herein by reference.

FIELD OF THE INVENTION

The present invention relates to a method for classifying a behavior of a pedestrian when crossing a roadway of a vehicle, to a corresponding device, to a corresponding computer program product, to a corresponding storage medium and to a passenger protection system.

BACKGROUND INFORMATION

Generally, predicting a pedestrian movement, i.e., estimating possible whereabouts of a pedestrian at risk at points in time in the future, is required in order to implement active pedestrian protection systems. Based on such a prediction, it may be decided whether an emergency braking or an emergency evasion is initiated in order to avoid an imminent accident.

SUMMARY OF THE INVENTION

Against this background, the approach described here presents a method and a device for classifying a behavior of a pedestrian when crossing a roadway of a vehicle, a corresponding computer program product, a corresponding storage medium and a passenger protection system according to the main claims. Advantageous embodiments are derived from the respective subclaims and the following description.

The present approach creates a method for classifying a behavior of a pedestrian when crossing a roadway of a vehicle, the method including the following steps:

reading in a sensor signal in order to detect the pedestrian and at least one piece of surroundings information regarding the surroundings of the pedestrian, the sensor signal representing a signal of at least one sensor of the vehicle;

ascertaining at least one physical variable of a relationship between the pedestrian and the at least one piece of surroundings information; and classifying the behavior of the pedestrian using the at least one physical variable.

A pedestrian may be understood to mean a person who is within the area of a roadway of a vehicle. Based on a behavior of the pedestrian, conclusions may be drawn concerning the possible movement or movement direction of the pedestrian within the area of the roadway. A behavior of the pedestrian may be understood to mean, for example, a pedestrian's a degree of attention or a readiness to cooperate. A roadway may be understood to mean a one-lane or multiple-lane roadway, for example, on which the vehicle is traveling. A vehicle may in particular be understood to mean a motor vehicle, for example a passenger vehicle, a truck, or a motorcycle. The pedestrian and a surroundings of the pedestrian may be detected with the aid of a sensor of the vehicle. A surroundings of the pedestrian may be understood to mean an area of the roadway which is at least partly visible or accessible to the pedestrian or also to a driver of the vehicle. The surroundings may also include objects next to the roadway, for example parking or driving vehicles or other obstacles, for example trees or traffic islands. The term surroundings is not limited to the roadway, but the surroundings may also include all objects and other elements such as lines and curbs. Features or elements of the surroundings detected using a sensor may be represented by surroundings information. A piece of surroundings information may be represented by an electrical signal or machine-readable data. Surroundings information may thus be further processed by a suitable device. The surroundings may, for example, be an area ahead of the vehicle, it being possible that the pedestrian is in this area.

A sensor may be understood to mean a camera of the vehicle which is pointed toward the area ahead, for example. Surroundings information may be understood to mean a piece of information concerning the surroundings which is relevant for an assessment of the behavior of the pedestrian. For example, the surroundings information may represent an obstacle, an open area or other objects such as an additional pedestrian or an additional vehicle in the surroundings of the pedestrian or even the position and the course of curbs and road markings. There may be a correlation between the pedestrian and the surroundings information. A correlation may be understood to mean a spatial, temporal or spatiotemporal relationship which may be expressed by a corresponding physical variable. A physical variable may, for example, be understood to mean a measured value of a velocity, an acceleration, a distance or a time period.

The present approach is based on the finding that information from the surroundings of a pedestrian may be used to determine a possible behavior of the pedestrian when crossing a roadway.

Based on a behavior determined in such a way, a reliable prediction of a possible pedestrian movement, for example, may be carried out.

Such a context-dependent prediction may also be carried out using features which are directly assigned to the pedestrian.

The information or features may, for example, be determined from data of a video surroundings sensor system of a vehicle, in particular of a stereo-video-camera which is pointed toward the front.

In this way, the usability of the prediction may be increased compared to conventional methods, and an erroneous trigger rate, in particular in case of an emergency evasion of the vehicle, may be decreased.

In order to avoid erroneous triggering, a method may be used in emergency braking systems which in the prediction takes all possible trajectories into consideration which a pedestrian is physically capable of pursuing. An emergency braking is only triggered in this case when all possible, or a very large proportion, for example, 90%, of the trajectories lead to a collision.

For systems which are configured to avoid a collision with a pedestrian using an evasive maneuver, possibly combined with an automatic emergency braking, a maximum likelihood may be unsuitable, since it may lead to an overestimate of an actually required evasion width or does not allow unambiguous decisions for an evasion direction or width. The pedestrian may potentially be in many different places in the future. In order to plan a suitable evasive maneuver nevertheless, more conservative assumptions concerning future whereabouts may be used. For example, it may be assumed that the pedestrian is moving at a constant velocity. However, this is not suitable in all situations. For example, the pedestrian often stops shortly before crossing the road, since he/she has already seen an approaching vehicle. In order to take this into account, a possible stop line of the pedestrian may be determined. For example, movement features may be used for this, for example, an optical flow of leg and upper body areas of the pedestrian in order to predict whether the pedestrian will stop or cross the road.

According to one specific embodiment of the present approach, the method may include a step of determining at least one possible trajectory of the pedestrian as a function of the behavior of the pedestrian, which was classified in the step of classifying. A possible trajectory may be understood to mean a possible flow of movement of the pedestrian when crossing the roadway. By determining at least one possible trajectory of the pedestrian, a possible collision of the pedestrian with the vehicle may be detected early on.

According to one other specific embodiment of the present approach, the method may include a step of providing an activation signal for activating a passenger protection device of the vehicle as a function of the possible trajectory. A passenger protection device may, for example, be a passenger protection device, for example, in the form of one or multiple airbags, or a pedestrian protection device, for example, in the form of an automatic braking or evasive maneuver of the vehicle. With the aid of this specific embodiment of the present approach, a risk of injury to pedestrians, vehicle occupants, or other road users may be decreased.

Furthermore, a surroundings model of the surroundings of the pedestrian may be created using the sensor signal in the step of reading in in order to detect the pedestrian and the surroundings information. A surroundings model may be understood to mean a database for detailed and real-time-capable imaging of the surroundings of the pedestrian. By using such a surroundings model, the pedestrian and the surroundings information may be detected very precisely and reliably.

Furthermore, the behavior of the pedestrian may be classified using a hidden Markov model and/or a support vector machine and/or fuzzy logic and/or neural networks in the step of classifying. This makes it possible to carry out a robust estimate of the pedestrian behavior.

In addition, at least one possible stop line of the pedestrian may be detected as surroundings information in the step of reading in. In this case, a velocity of a relative movement between the pedestrian and the possible stop line may be ascertained in the step of ascertaining. The behavior of the pedestrian may be classified using the velocity of the relative movement in the step of classifying. A possible stop line may be an actual or fictitious line at which the pedestrian stops before crossing the roadway. The possible stop line may, for example, be road markings or the edge of the roadway. With the aid of the velocity of the relative movement between the pedestrian and the possible stop line, it may be inferred whether or at which point in time the pedestrian will cross the roadway.

According to another specific embodiment of the present approach, at least one pedestrian crossing the roadway may be detected in the step of reading in as surroundings information. In this case, a distance between the pedestrian and the pedestrian crossing the roadway may be ascertained in the step of ascertaining. The behavior of the pedestrian may be classified using the distance in the step of classifying. With the aid of the distance it may be inferred whether the pedestrian immediately follows the pedestrian crossing the road or not.

Furthermore, at least one possible crossing point of the pedestrian may be detected as surroundings information in the step of reading in. In the step of ascertaining, a distance between the pedestrian and the possible crossing point may be ascertained. The behavior of the pedestrian may be classified using the distance in the step of classifying. A possible crossing point may, for example, be a bus stop, a building, a crosswalk, or a traffic light. The likelihood with which the pedestrian crosses the roadway may also be determined with great accuracy with this specific embodiment of the present approach.

According to another specific embodiment of the present approach, the crossing point may furthermore be detected in the step of detecting or ascertaining using GPS information and/or map information. In this way, a great accuracy in ascertaining the distance between the pedestrian and the possible crossing point may be achieved.

Furthermore, a possible line of sight may be detected between the vehicle and the pedestrian as surroundings information in the step of reading in. Here, a time span of the possible line of sight may be ascertained in the step of ascertaining. The behavior of the pedestrian may be classified using the time span in the step of classifying. A possible line of sight may be understood to mean an open area between the vehicle and the pedestrian. The possible line of sight may be a mutual visibility of the pedestrian and the driver of the vehicle. The time span may thus be understood to mean the duration of time during which the pedestrian may have seen the vehicle, taking visual obstructions into account. The longer the time span is, the more likely it is that the vehicle is perceived by the pedestrian. With the aid of this specific embodiment of the present approach, an attention of the pedestrian may be evaluated.

Furthermore, the body size and/or a viewing direction of the pedestrian may be detected. The behavior of the pedestrian may furthermore be classified here as a function of the body size and/or the viewing direction in the step of classifying. With the aid of this specific embodiment of the present approach, a reliable evaluation of the attention of the pedestrian may be implemented.

The approach presented here furthermore provides a device which is configured to carry out or implement the steps of one variant of a method presented here in corresponding devices. The underlying object of the present invention may also be achieved quickly and efficiently as a result of this embodiment variant of the present invention in the form of a device.

In the present case, a device may be understood to mean an electrical device which processes sensor signals and outputs control and/or data signals as a function thereof. The device may include an interface which may be configured as hardware and/or software. In a hardware configuration, the interfaces may, for example, be part of a so-called system ASIC, which includes various functions of the device. However, it is also possible that the interfaces are separate integrated circuits or are made, at least in part, of discrete components. In a software configuration, the interfaces may be software modules, which, for example, are present on a microcontroller together with other software modules.

Also advantageous is a computer program product including program code which may be stored on a machine-readable medium such as a semiconductor memory, a hard disk memory or an optical memory and is used for carrying out the method according to one of the previously described specific embodiments when the program is executed on a computer or a device.

Furthermore, the present approach creates a machine-readable storage medium having a computer program stored thereon according to one of the specific embodiments described above.

Finally, the present approach creates a passenger protection system of a vehicle, the passenger protection system including the following features:
- at least one sensor for detecting a pedestrian and surroundings information regarding surroundings of the pedestrian;
- a device connected to the at least one sensor according to one of the previously described specific embodiments; and
- a passenger protection device which is configured to be activated by the device.

The approach presented here is elucidated in greater detail below on the basis of the attached drawings as an example.

DETAILED DESCRIPTION

Figure 1:
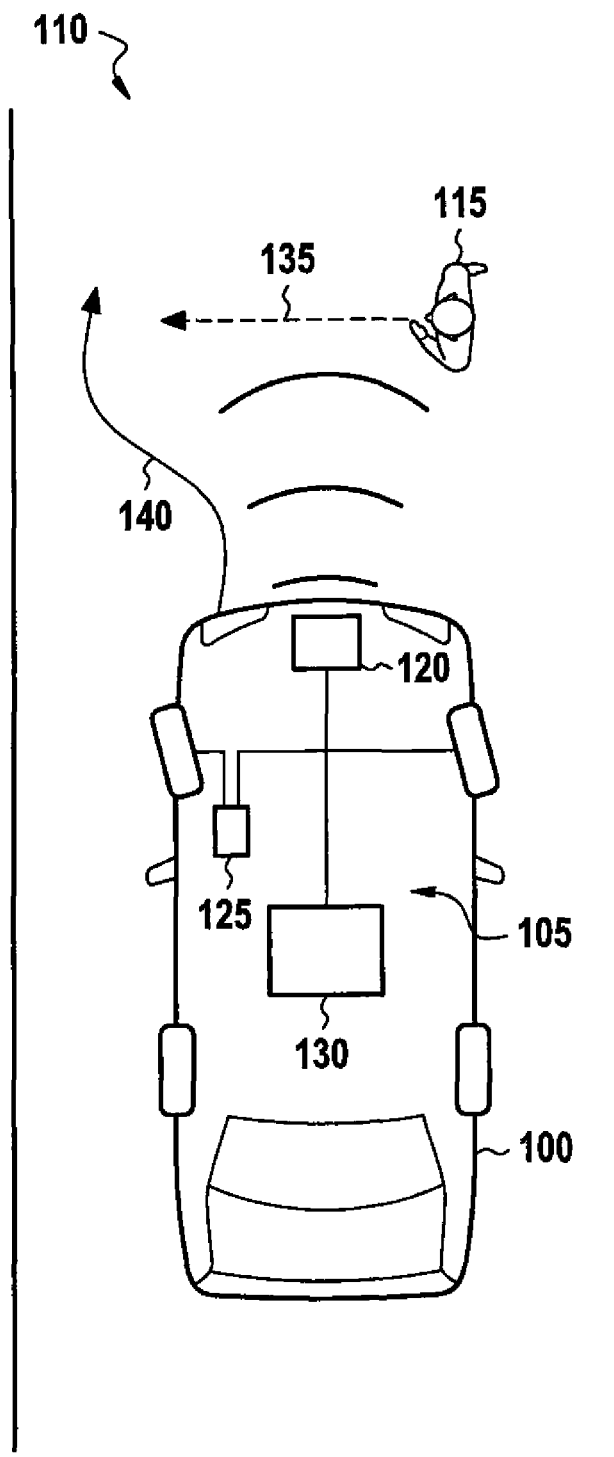
FIG. 1 shows a schematic illustration of a vehicle having a passenger protection system according to one exemplary embodiment of the present invention.

In the following description of advantageous exemplary embodiments of the present invention, the elements which are illustrated in the various figures and appear to be similar are identified with identical or similar reference numerals; a repetitive description of these elements is dispensed with.

FIG. 1 shows a schematic illustration of a vehicle 100 having a passenger protection system 105 according to one exemplary embodiment of the present invention. Vehicle 100 is located on a roadway 110. A pedestrian 115 is located ahead of vehicle 100. Pedestrian 115 is about to cross roadway 110. Passenger protection system 105 includes a sensor 120, a passenger protection device 125 as well as a control unit 130. Control unit 130 is connected to sensor 120 and passenger protection device 125. Sensor 120 is situated in a front area of vehicle 100 and directed at the area ahead of vehicle 100.

Sensor 120 is configured to detect pedestrian 115 as well as surroundings of pedestrian 115. Control unit 130 is configured to receive a sensor signal representing the surroundings and pedestrian 115 from sensor 120 and to ascertain a physical variable of a correlation between the surroundings and pedestrian 115 using the sensor signal. Furthermore, control unit 130 is configured to classify a behavior of pedestrian 115 as a function of the physical variable. As an example, the behavior of pedestrian 115 is classified by control unit 130 as the behavior of a pedestrian about to cross roadway 110 in FIG. 1.

Control unit 130 is also configured to determine at least one possible trajectory 135 of pedestrian 115 when crossing roadway 110 as a function of the behavior of pedestrian 115. In this case, control unit 130 may be configured to transmit an activation signal for activating a passenger protection device 125 to passenger protection device 125 as a function of possible trajectory 135.

Passenger protection device 125 is, for example, configured to effectuate an evasive movement 140 of vehicle 100 as a response to receiving the activation signal.

In this way, vehicle 100 may evade pedestrian 115 crossing road way 110 in time in order to avoid a collision between vehicle 100 and pedestrian 115.

Figure 2A:
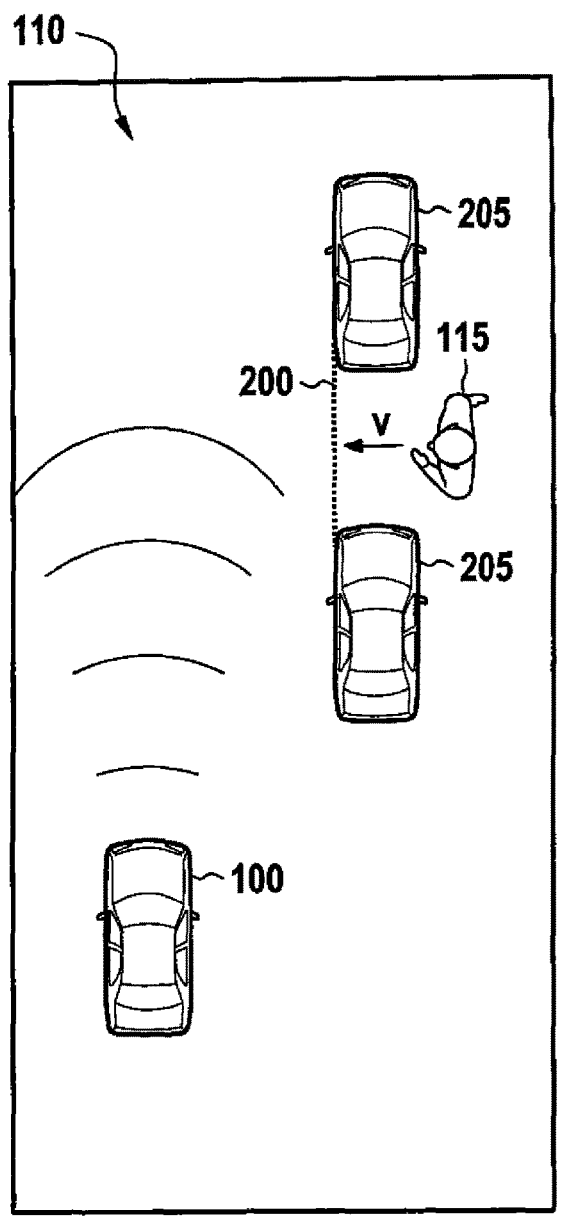
FIGS. 2a and 2b show schematic representations of a stop line for use in a method according to one exemplary embodiment of the present invention.
Figure 2B:
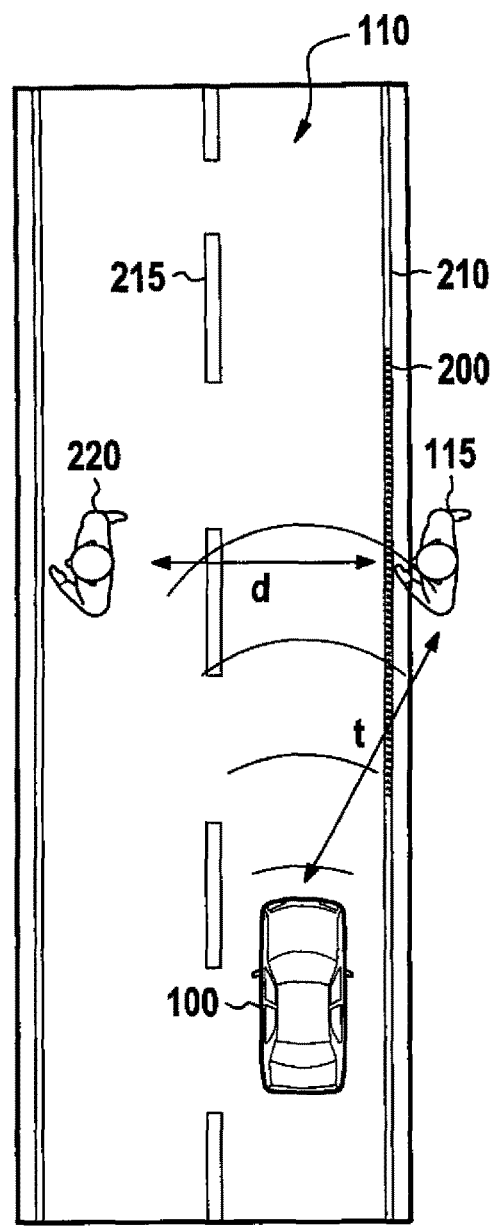

FIGS. 2a, 2b show schematic representations of a stop line 200 for use in a method according to one exemplary embodiment of the present invention.

FIG. 2a shows roadway 110 with vehicle 100. At an edge of roadway 110, two additional vehicles 205 are parked. Additional vehicles 205 are positioned behind one another. Pedestrian 115 moves toward stop line 200 in a space between additional vehicles 205. In FIG. 2a, stop line 200 is not directly visible but fictitious. Stop line 200 results here from a connecting line between the parked cars 205.

Vehicle 100 is configured to detect stop line 200 as well as pedestrian 115 and to ascertain a physical variable of a correlation between stop line 200 and pedestrian 115. For example, vehicle 100 is configured to ascertain a velocity v of a relative movement between stop line 200 and pedestrian 115 and to classify a behavior of pedestrian 115 regarding a possible movement pattern of pedestrian 115 when crossing roadway 110 as a function of velocity v.

In contrast to FIG. 2a, stop line 200 in FIG. 2b corresponds as an example to lane markings 210 of the edge of the roadway. For example, a median strip 215 or other markings of roadway 110 may be detected as stop line 200.

In addition, one additional pedestrian 220 is depicted in FIG. 2b. In contrast to pedestrian 115, who is at the edge of the roadway, additional pedestrian 220 has already largely crossed roadway 110. According to one exemplary embodiment of the present invention, vehicle 100 is configured to furthermore detect the one additional pedestrian 220 and to ascertain a distance d between pedestrian 115 and the one additional pedestrian 220. A possible behavior of pedestrian 115 may be inferred as a function of a value of distance d. For example, the behavior of pedestrian 115 may be classified as the behavior of a pedestrian crossing roadway 110, if distance d has a relatively low value, for example, compared to an also detected roadway width.

According to one other exemplary embodiment of the present invention, vehicle 100 is configured to detect a possible line of sight between vehicle 100 and pedestrian 115 and to ascertain a time span t of the possible line of sight. Alternatively or in addition, the behavior of pedestrian 115 may be classified as a function of time span t.

Figure 3:
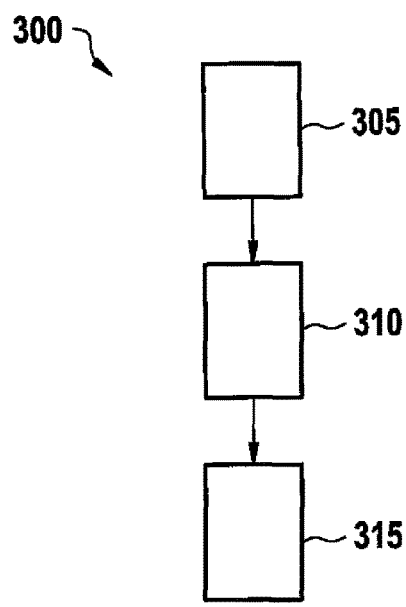
FIG. 3 shows a flow chart of one exemplary embodiment of a method for classifying a behavior of a pedestrian when crossing a roadway of a vehicle.

FIG. 3 shows a flow chart of an exemplary embodiment of a method 300 for classifying a behavior of a pedestrian when crossing a roadway of a vehicle. Method 300 includes a step 305 of reading in a sensor signal in order to detect the pedestrian and at least one piece of surroundings information regarding the surroundings of the pedestrian, the sensor signal representing a signal of at least one sensor of the vehicle. Furthermore, method 300 includes a step 310 of ascertaining a physical variable of a correlation between the pedestrian and the at least one piece of surroundings information. Finally, method 300 includes a step 315 of classifying the behavior of the pedestrian using the at least one physical variable.

According to one exemplary embodiment of the present invention at least one possible crossing point of the pedestrian is detected as surroundings information in step 305 of reading in. Here, a distance between the pedestrian and the possible crossing point is ascertained as a physical variable in step 310 of ascertaining. Finally, the behavior of the pedestrian is classified in step 315 using the distance.

Figure 4:
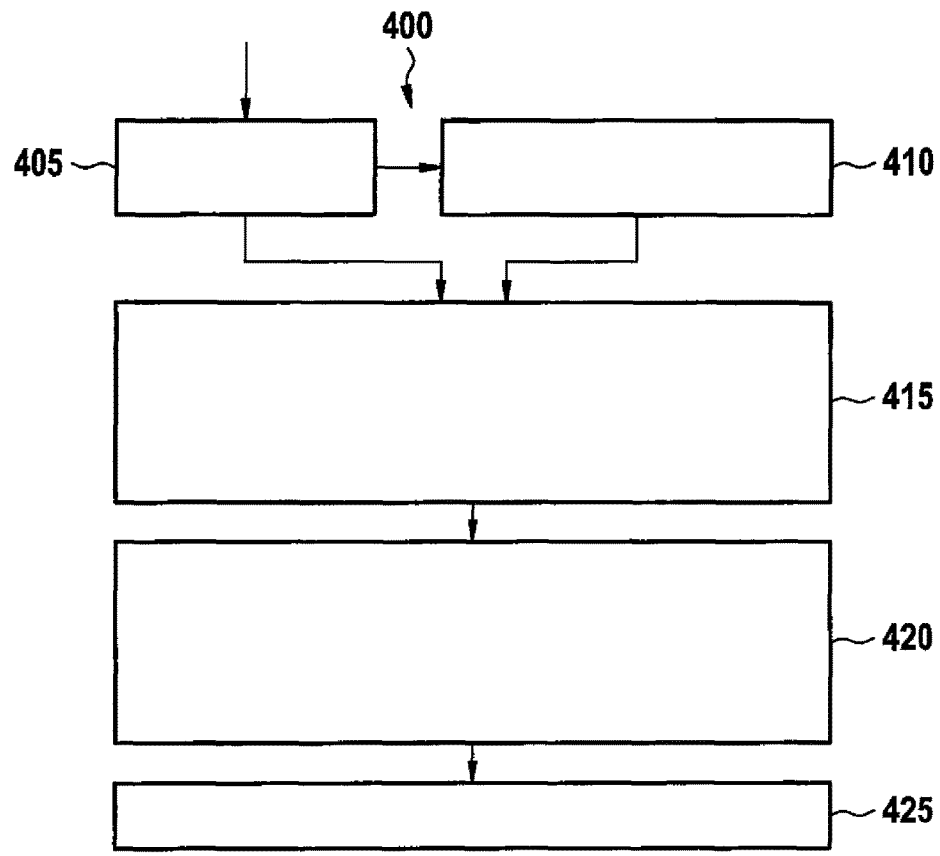
FIG. 4 shows a system structure of a passenger protection system according to one exemplary embodiment of the present invention.

FIG. 4 shows a system structure 400 of a passenger protection system according to one exemplary embodiment of the present invention. In a step 405, sensor data, which were provided, for example, by a stereo-video sensor pointed toward an area ahead of a vehicle, are initially preprocessed. During the preprocessing, a disparity graph or classifiers, for example, are created. In response to step 405 of preprocessing, a surroundings model of surroundings of the vehicle is created in a step 410. The surroundings model may, for example, include an occupancy grid, a list of objects, or a description of open areas.

In a step 415, a determination of features is carried out using the sensor data preprocessed in step 405 and/or the surroundings model created in step 410. For example, a relation of a pedestrian to a fictitious stop line or other pedestrians or also a duration of a mutual visibility of the vehicle and the pedestrian are determined here.

In response to step 415 of the determination of features, a step 420 of behavioral classification takes place. For example, the behavior of the pedestrian is classified as "stops" as opposed to "crosses," as "attentive" as opposed to "inattentive," or as "cooperative" as opposed to "uncooperative."

Finally, as a function of the behavioral classification carried out in step 420, a prediction based on the classified behavior is carried out in a step 425.

According to an exemplary embodiment shown in FIGS. 1, 2a, 2b and 4 of the present invention, a surroundings model is inferred based on surroundings sensors 120 and a corresponding raw data preprocessing, for example, a determination of a disparity graph from a stereo-video sensor system, or a classification from grayscale values of a video image. This model includes information on obstacles, for example in the form of an obstacle map, as an occupancy grid, as an open area or in the form of objects.

Based on these data, features are extracted which are used to classify the behavior of pedestrian 115. Possible classes of pedestrian behavior are, for example: "pedestrian 115 stops" as opposed to "pedestrian 115 crosses roadway 110," "pedestrian 115 changes his/her direction of movement" as opposed to "pedestrian 115 maintains his/her direction of movement," "pedestrian 115 has seen ego vehicle 100" as opposed to "pedestrian 115 has not seen ego vehicle 100," or "pedestrian 115 behaves cooperatively," i.e., helps avoid an accident, as opposed to "pedestrian 115 does not behave cooperatively."

The classification of the pedestrian behavior based on the features may, for example, be implemented using hidden Markov models (HMM), i.e., each hidden condition corresponds to a pedestrian behavior, support vector machines (SVM), fuzzy logic, or neural networks (NN). Using the mentioned methods, several features may be merged. In this way, a robust estimate of the pedestrian behavior may be achieved.

Based on the detected pedestrian behavior, a suitable prediction may be carried out subsequently. For example, such a context-dependent prediction of pedestrian 115 may be used for activating an active pedestrian protection system 105.

In the following, several features are described which, together, may be used to classify the pedestrian behavior. A mere subset of the features may also be used.

An important feature for classifying the pedestrian movement is a relative movement of pedestrian 115 to a possibly fictitious stop line 200. This is based on the model that pedestrian 115, who wants to cross roadway 110, imagines a line at which he/she stops in case traffic makes immediate crossing not possible. Such stop lines 200 are, for example, implemented as roadway delimitations, for example, a curb, lane markings 210, 215, or delimitations to an area in which vehicle 100 will presumably not travel, for example an area between two parked vehicles 205, as shown for example in FIG. 2a.

A positive or negative acceleration of pedestrian 115, which is necessary for pedestrian 115 to still stop before stop line 200, may be used as a feature. If the acceleration is very great, this may be seen as an indicator for a pedestrian state of "crosses roadway 110," "has missed vehicle 100" or "does not behave cooperatively."

One other feature represents a movement of other pedestrians 220. If pedestrian 220 has already crossed roadway 110, this may be used as an indicator that pedestrian 115, standing at the edge of the roadway, will follow pedestrian 220 and also cross roadway 110. Here, distance d to the already crossing pedestrian 220 may be used as a feature.

A size of pedestrian 115 may also be used as an indicator for his/her behavior. A small pedestrian 115 may possibly be a child who with greater probability will adopt the states "crosses roadway 110," "has missed ego vehicle 100," or "does not behave cooperatively," than a large pedestrian 115, who may possibly be an adult.

The longer pedestrian 115 and ego vehicle 100 are mutually visible, i.e., are not hidden as seen from the ego view of pedestrian 115, the more likely it is that pedestrian 115 "stops," "has seen ego vehicle 100," or "behaves cooperatively." A brief, mutual visibility on the other hand speaks for the respective other behavioral states.

An immediate proximity of pedestrian 115 to specific places such as a bus stop, a school, or a kindergarten, detected alternatively or in addition with the aid of GPS data or map data, increases the probability of the states "crosses the roadway 110," "has missed ego vehicle 100," or "does not behave cooperatively." In the case of a bus stop, the presence of a waiting bus at the bus stop may additionally be detected.

Crosswalks, traffic lights or traffic signs increase the probability of the state "pedestrian 115 crosses roadway 110." In order to unambiguously ascertain alternative state pairs such as "pedestrian 115 has seen ego vehicle 100," as opposed to "pedestrian 115 has not seen ego vehicle 100," and "pedestrian 115 behaves cooperatively," as opposed to "pedestrian 115 does not behave cooperatively," this feature may be compared, for example, with additional mentioned features.

Optionally, the viewing direction of pedestrian 115 may be used in order to determine whether pedestrian 115 has already seen vehicle 100 or not. With the aid of the viewing direction it may furthermore be determined which destination pedestrian 115 is aiming for or whether he/she is planning to change his/her direction of movement.

Figure 5:
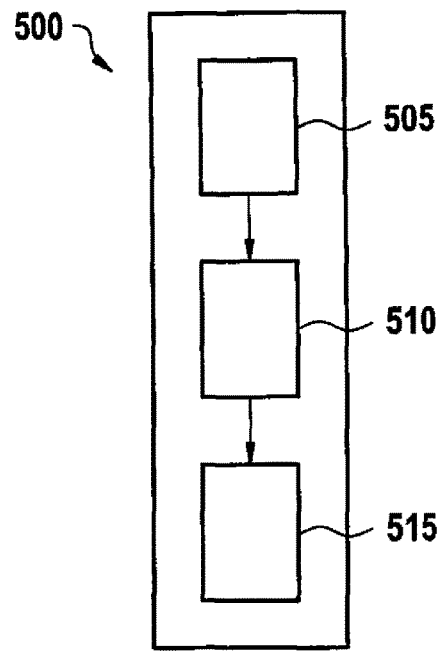
FIG. 5 shows a block diagram of one exemplary embodiment of a device for classifying a behavior of a pedestrian when crossing a roadway of a vehicle.

FIG. 5 shows a block diagram of an exemplary embodiment of a device 500 for classifying a behavior of a pedestrian when crossing a roadway of a vehicle. Device 500 may be control unit 130 shown in FIG. 1. Device 500, also called a classifier for pedestrian movements, includes a unit 505 for reading in a sensor signal in order to detect the pedestrian and at least one piece of surroundings information regarding surroundings of the pedestrian, the sensor signal representing a signal of at least one sensor of the vehicle. Unit 505 is connected to a unit 510 for ascertaining at least one physical variable of a correlation between the pedestrian and the at least one piece of surroundings information. Device 500 finally includes a unit 515 which is connected to unit 510 and which is configured to classify the behavior of the pedestrian using the at least one physical variable.

The exemplary embodiments described here and illustrated in the figures are selected only as examples. Different exemplary embodiments may be combined with each other completely or in regard to individual features. Also, one exemplary embodiment may be supplemented with characteristics of another exemplary embodiment.

Furthermore, the method steps presented here may also be repeated or carried out in a sequence different from the sequence described.

If one exemplary embodiment includes an "and/or" link between a first feature and a second feature, this means that the exemplary embodiment according to one specific embodiment includes both the first and the second feature, and according to another specific embodiment includes only the first feature or only the second feature.

What is claimed is:

1. A method for classifying a behavior of a pedestrian when crossing a roadway of a vehicle, the method comprising:
    reading in sensor signals, from surroundings sensors of the vehicle, to detect the pedestrian and at least one piece of surroundings information regarding surroundings of the pedestrian;
    ascertaining at least one physical variable of a relationship between the pedestrian and the at least one piece of surroundings information;
    classifying the behavior of the pedestrian using the at least one physical variable;
    determining at least one possible trajectory of the pedestrian as a function of the behavior of the pedestrian classified in the classifying; and
    providing an activation signal to activate at least one component of a passenger protection system of the vehicle as a function of the possible trajectory;
    wherein the passenger protection system includes: (i) an air-bag arrangement, and (ii) a pedestrian protection device having an automatic braking arrangement and an evasive maneuvering arrangement, and
    wherein the at least one component of the passenger protection system includes at least one of the automatic braking arrangement, the evasive maneuvering arrangement, and the air-bag arrangement.

2. The method of claim 1, wherein a surroundings model is determined based on the sensor signals from the surroundings sensors and a preprocessing of corresponding sensor data, and wherein the classifying of the behavior is based on the surroundings model.

3. The method of claim 1, wherein in the reading in at least one possible stop line of the pedestrian is detected as surroundings information, and wherein in the ascertaining a velocity of a relative movement between the pedestrian and the possible stop line is ascertained as a physical variable and the behavior of the pedestrian is classified using the velocity of the relative movement in the classifying.

4. The method of claim 1, wherein in the reading in at least one pedestrian crossing the roadway is detected as surroundings information, in the ascertaining a distance between the pedestrian and the pedestrian crossing the roadway being ascertained as a physical variable and the behavior of the pedestrian being classified using the distance in the classifying.

5. The method of claim 1, wherein in the reading in at least one possible crossing point of the pedestrian is detected as surroundings information, in the ascertaining a distance between the pedestrian and the possible crossing point being ascertained as a physical variable and the behavior of the pedestrian being classified using the distance in the classifying.

6. The method of claim 1, wherein in the reading in, a possible line of sight between the vehicle and the pedestrian is detected as surroundings information, a time span of the possible line of sight being ascertained as a physical variable in the ascertaining and the behavior of the pedestrian being classified using the time span in the classifying.

7. The method of claim 1, wherein in the reading in a body size and/or a viewing direction of the pedestrian is further detected, the behavior of the pedestrian being further classified in the classifying as a function of the body size and/or the viewing direction.

8. The method of claim 1, wherein the classifying includes classifying into one of behavior classes the behavior of the pedestrian using the at least one physical variable, wherein an indicator of the behavior includes a body size of the pedestrian, and wherein the behavior classes include at least one of: (i) the pedestrian stops; (ii) the pedestrian crosses the roadway; (iii) the pedestrian changes a movement direction; (iv) the pedestrian does not change the movement direction; (v) the pedestrian sees the vehicle; (vi) the pedestrian does not see the vehicle; (vii) the pedestrian behaves cooperatively with respect to the vehicle; and (viii) the pedestrian does not behave cooperatively with respect to the vehicle.

9. A device for classifying a behavior of a pedestrian when crossing a roadway of a vehicle, comprising:
    a reading arrangement to read in sensor signals, from surroundings sensors of the vehicle, to detect the pedestrian and at least one piece of surroundings information regarding surroundings of the pedestrian;
    an ascertaining arrangement to ascertain at least one physical variable of a relationship between the pedestrian and the at least one piece of surroundings information;
    a classifying arrangement to classify the behavior of the pedestrian using the at least one physical variable;
    a determining arrangement to determine at least one possible trajectory of the pedestrian as a function of the behavior of the pedestrian classified in the classifying; and
    an activation signal arrangement to activate at least one component of a passenger protection system of the vehicle as a function of the possible trajectory;
    wherein the passenger protection system includes: (i) an air-bag arrangement, and (ii) a pedestrian protection device having an automatic braking arrangement and an evasive maneuvering arrangement, and
    wherein the at least one component of the passenger protection system includes at least one of the automatic braking arrangement, the evasive maneuvering arrangement, and the air-bag arrangement.

10. The device of claim 9, wherein the classifying includes classifying into one of behavior classes the behavior of the pedestrian using the at least one physical variable, wherein an indicator of the behavior includes a body size of the pedestrian, and wherein the behavior classes include at least one of: (i) the pedestrian stops; (ii) the pedestrian crosses the roadway; (iii) the pedestrian changes a movement direction; (iv) the pedestrian does not change the movement direction; (v) the pedestrian sees the vehicle; (vi) the pedestrian does not see the vehicle; (vii) the pedestrian behaves cooperatively with respect to the vehicle; and (viii) the pedestrian does not behave cooperatively with respect to the vehicle.

11. A non-transitory computer readable medium having a computer program, which is executable by a processor, comprising:
  a program code arrangement having program code for classifying a behavior of a pedestrian when crossing a roadway of a vehicle, by performing the following:
    reading in sensor signals, from surroundings sensors of the vehicle, to detect the pedestrian and at least one piece of surroundings information regarding surroundings of the pedestrian;
    ascertaining at least one physical variable of a relationship between the pedestrian and the at least one piece of surroundings information;
  classifying into one of behavior classes the behavior of the pedestrian using the at least one physical variable;
  determining at least one possible trajectory of the pedestrian as a function of the behavior of the pedestrian classified in the classifying; and
  providing an activation signal to activate at least one component of a passenger protection system of the vehicle as a function of the possible trajectory;
  wherein the passenger protection system includes: (i) an air-bag arrangement, and (ii) a pedestrian protection device having an automatic braking arrangement and an evasive maneuvering arrangement, and
  wherein the at least one component of the passenger protection system includes at least one of the automatic braking arrangement, the evasive maneuvering arrangement, and the air-bag arrangement.

12. The computer readable medium of claim 9, wherein the classifying includes classifying into one of behavior classes the behavior of the pedestrian using the at least one physical variable, wherein an indicator of the behavior includes a body size of the pedestrian, and wherein the behavior classes include at least one of: (i) the pedestrian stops; (ii) the pedestrian crosses the roadway; (iii) the pedestrian changes a movement direction; (iv) the pedestrian does not change the movement direction; (v) the pedestrian sees the vehicle; (vi) the pedestrian does not see the vehicle; (vii) the pedestrian behaves cooperatively with respect to the vehicle; and (viii) the pedestrian does not behave cooperatively with respect to the vehicle.

13. A passenger protection system of a vehicle, comprising:
  at least one sensor for detecting a pedestrian and one piece of surroundings information regarding surroundings of the pedestrian;
  a device for classifying a behavior of a pedestrian when crossing a roadway of a vehicle, including:
    a reading arrangement to read in sensor signals, from surroundings sensors of the vehicle, to detect the pedestrian and at least one piece of surroundings information regarding surroundings of the pedestrian;
    an ascertaining arrangement to ascertain at least one physical variable of a relationship between the pedestrian and the at least one piece of surroundings information; and
    a classifying arrangement to classify the behavior of the pedestrian using the at least one physical variable;
  a passenger protection device which is activatable by an activation signal of the device;
  wherein at least one possible trajectory of the pedestrian is determined as a function of the behavior of the pedestrian classified in the classifying,
  wherein the activation signal is to activate at least one component of the passenger protection device as a function of the possible trajectory, and
  wherein the passenger protection system includes: (i) an air-bag arrangement, and (ii) a pedestrian protection device having an automatic braking arrangement and an evasive maneuvering arrangement, and
  wherein the at least one component of the passenger protection system includes at least one of the automatic braking arrangement, the evasive maneuvering arrangement, and the air-bag arrangement.

14. The passenger protection system of claim 13, wherein the classifying includes classifying into one of behavior classes the behavior of the pedestrian using the at least one physical variable, wherein an indicator of the behavior includes a body size of the pedestrian, and wherein the behavior classes include at least one of: (i) the pedestrian stops; (ii) the pedestrian crosses the roadway; (iii) the pedestrian changes a movement direction; (iv) the pedestrian does not change the movement direction; (v) the pedestrian sees the vehicle; (vi) the pedestrian does not see the vehicle; (vii) the pedestrian behaves cooperatively with respect to the vehicle; and (viii) the pedestrian does not behave cooperatively with respect to the vehicle.

* * * * *